(12) United States Patent
Kamepalli et al.

(10) Patent No.: US 10,719,137 B1
(45) Date of Patent: Jul. 21, 2020

(54) USER IDENTIFICATION VIA HAND DETECTION USING A HOVERING KEYBOARD

(71) Applicant: Dell Products, L.P., Round Rock, TX (US)

(72) Inventors: Srinivas Kamepalli, Austin, TX (US); Deeder M. Aurongzeb, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/408,177

(22) Filed: May 9, 2019

(51) Int. Cl.
*G06F 3/02* (2006.01)
*G06F 3/01* (2006.01)
*H01H 13/83* (2006.01)
*G06F 21/31* (2013.01)
*H03K 17/945* (2006.01)

(52) U.S. Cl.
CPC ............ *G06F 3/0219* (2013.01); *G06F 3/011* (2013.01); *G06F 3/017* (2013.01); *G06F 21/31* (2013.01); *H01H 13/83* (2013.01); *H03K 17/945* (2013.01); *G06F 2221/2149* (2013.01); *H01H 2219/036* (2013.01)

(58) Field of Classification Search
USPC ......................................... 345/156, 168, 173
See application file for complete search history.

(56) References Cited

U.S. PATENT DOCUMENTS

| | | | |
|---|---|---|---|
| 2003/0036879 A1* | 2/2003 | Sagar ................. | G06F 3/04895 702/150 |
| 2009/0237361 A1* | 9/2009 | Mosby ............... | G06F 3/04883 345/173 |
| 2014/0168083 A1* | 6/2014 | Ellard ................ | G06F 3/04886 345/168 |
| 2015/0100910 A1* | 4/2015 | Luo .................... | G06F 3/04883 715/771 |
| 2015/0143276 A1* | 5/2015 | Luo ........................ | G06F 1/1626 715/773 |
| 2015/0185857 A1* | 7/2015 | Jung ..................... | G06F 3/0304 345/156 |
| 2015/0185869 A1* | 7/2015 | Chng ................... | G06F 1/1662 345/168 |
| 2016/0364138 A1* | 12/2016 | Luo .................... | G06F 3/04886 |
| 2017/0003876 A1* | 1/2017 | Marsden ........... | H03K 17/9622 |
| 2017/0153812 A1* | 6/2017 | Creager .............. | G06F 3/0202 |
| 2018/0181199 A1* | 6/2018 | Harvey ................ | G06T 19/006 |
| 2019/0294258 A1* | 9/2019 | Forlines .............. | G06F 3/0416 |

* cited by examiner

*Primary Examiner* — Tony O Davis
(74) *Attorney, Agent, or Firm* — Fogarty LLP (57) ABSTRACT

Systems and methods for identifying users via hand detection using a hovering keyboard are described. In some embodiments, an Information Handling System (IHS) may include a processor, and a memory coupled to the processor, the memory having program instructions stored thereon that, upon execution by the processor, cause the IHS to: detect a hand using proximity sensors disposed on a hovering keyboard coupled to the IHS; and identify a user based on the detection.

17 Claims, 5 Drawing Sheets

USER IDENTIFICATION VIA HAND DETECTION USING A HOVERING KEYBOARD

FIELD

This disclosure relates generally to Information Handling Systems (IHSs), and more specifically, to systems and methods for identifying users via hand detection using a hovering keyboard.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In various implementations, IHSs process information received via a keyboard. A conventional keyboard includes components such as scissor switch keys, dome switch keys, levers, membranes, bucking springs, etc. These components are configured to receive physical keystrokes when a user actually touches and/or presses the keyboard's keys.

In addition, certain types of keyboards now also come equipped with proximity sensors. These proximity sensors are configured to measure distances between the user's hand or fingers to the keyboard. In operation, such a keyboard can detect signals representative of proximity and, when appropriate, it can interpret them as "hovering keystrokes"—even in the absence of physical contact between the keyboard and the user's fingers.

SUMMARY

Embodiments of systems and methods for identifying users via hand detection using a hovering keyboard are described. In an illustrative, non-limiting embodiment, an Information Handling System (IHS) may include a processor, and a memory coupled to the processor, the memory having program instructions stored thereon that, upon execution by the processor, cause the IHS to: detect a hand using proximity sensors disposed on a hovering keyboard coupled to the IHS; and identify a user based on the detection.

To identify the user, the program instructions, upon execution, may cause the IHS to fit proximity data obtained by the proximity sensors to a geometric model of the hand. The geometric model may include a partial virtual skeleton of the hand having one or more parameters selected from the group consisting of: a length, a width, a joint position, an angle of joint rotation, and a finger segment.

In some cases, identifying the user may include distinguishing whether the user is a child or an adult. Additionally, or alternatively, identifying the user may include identifying a username.

To identify the user, the program instructions, upon execution, may cause the IHS to instruct the user to place the hand over the hovering keyboard. Additionally, or alternatively, to identify the user, the program instructions, upon execution, may cause the IHS to instruct the user to make one or more selected physical keystrokes. Additionally, or alternatively, to identify the user, the program instructions, upon execution, may cause the IHS to instruct the user to make one or more selected hovering keystrokes.

The program instructions, upon execution, may cause the IHS to light selected keys corresponding to a position of the hand over the hovering keyboard. For example, each of the selected keys may be lit with a color or a brightness corresponding to a distance between a portion of the hand above the selected key and the hovering keyboard. Additionally or alternatively, at least one of the selected keys may be lit with a first color or brightness during the detection, and with a second color or brightness in response to the identification.

The program instructions, upon execution, may cause the IHS to apply a selected one of a plurality of different layouts to the hovering keyboard based upon the identification of the user. For example, the selected layout may assign a function key of the hovering keyboard to a user preference. Additionally, or alternatively, the selected layout may disable one or more keys of the hovering keyboard.

In another illustrative, non-limiting embodiment, a method may include detecting a hand, by an IHS, using proximity sensors disposed on a hovering keyboard coupled to the IHS; and identifying a user, by the IHS, based on the detection. In some cases, the method may include fitting proximity data obtained by the proximity sensors to a partial virtual skeleton of the hand having one or more parameters selected from the group consisting of: a length, a width, a joint position, an angle of joint rotation, and a finger segment.

The method may include lighting selected keys corresponding to a position of the hand over the hovering keyboard, where each of the selected keys is lit with a color or a brightness corresponding to a distance between a portion of the hand above the selected key and the hovering keyboard. The method may also include, in response to: (i) the user being identified as a child, or (ii) the identification of the user not matching a user logged into the IHS, performing at least one of: alerting an administrator, turning physical keystroke detection on or off, enforcing parental controls, or closing an application or file.

In yet another illustrative, non-limiting embodiment, a hardware memory device may have program instructions stored thereon that, upon execution by a processor of an IHS, cause the IHS to: detect a hand using proximity sensors disposed on a hovering keyboard coupled to the IHS; compare proximity data obtained by the proximity sensors against a model the hand having one or more parameters selected from the group consisting of: a length, a width, a joint position, an angle of joint rotation, and a finger segment; and identify a user based upon the comparison. The program instructions, upon execution, may further cause the IHS to apply a selected one of a plurality of different layouts to the hovering keyboard based upon the identification of the user.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
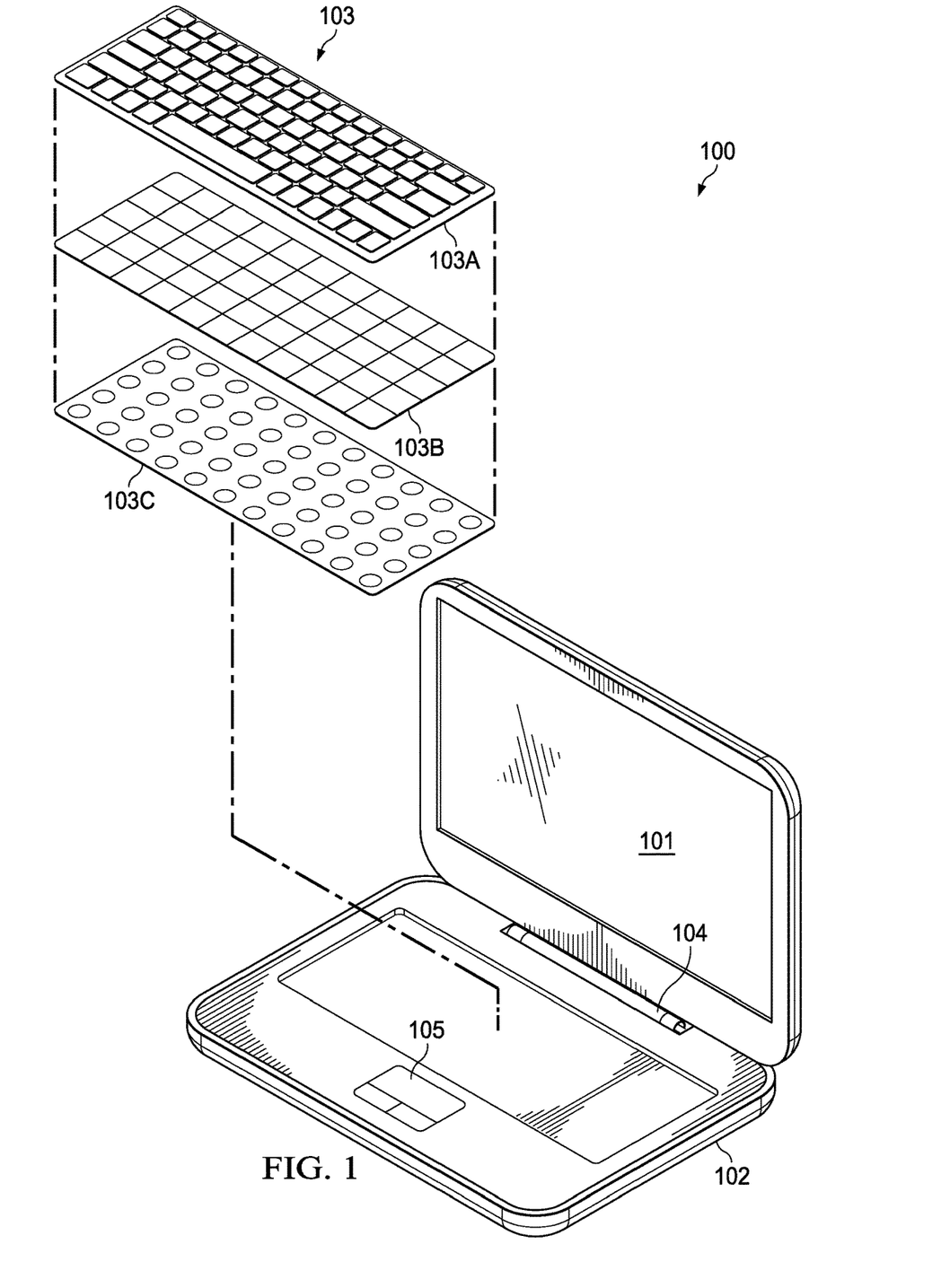
FIG. 1 is a perspective view of an Information Handling System (IHS) with a hovering keyboard, according to some embodiments.

FIG. 1 is a perspective view of Information Handling System (IHS) 100 with hovering keyboard 103. In this illustrative, non-limiting embodiment, IHS 100 includes display 101 and base or chassis 102, coupled to each other via hinge 104. Chassis 102 includes trackpad 105 or the like, and it holds keyboard 103. In this implementation, IHS 100 has a laptop or notebook form factor, such that keyboard 103 is directly integrated thereto. In other implementations, however, IHS 100 may be a desktop computer, video game console, appliance, etc., and keyboard 103 may be a peripheral keyboard separate from IHS 100. In those cases, keyboard 103 may be coupled to IHS 100 via a cable or wire (e.g., over a PS/2 connector, USB bus, etc.) or wirelessly (e.g., Bluetooth). Inputs made at keyboard 103 are communicated to keyboard controller 300 (shown in FIG. 3) for use by IHS 100.

In this example, hovering keyboard 103 is depicted with three layers or membranes: an electromechanical layer 103A, backlight illumination layer 103B, and proximity sensing layer 103C. When hovering keyboard 103 is assembled, layers 103A-C are stacked on top of each other to operate as follows: Electromechanical layer 103A is where keycap assemblies reside, and it is configured to detect physical keypresses against key caps; backlight illumination layer 103B comprises a plurality of LEDs configured to illuminate key caps from the bottom up; and proximity sensing layer is configured to detect hovering keypresses, such that in some cases, a finger's proximity to a key cap, without actually touching it, can also be detected as a keypress.

In other hovering keyboard implementations, the order in which layers 103B and 103C are stacked may be different than what is shown in FIG. 1. In some cases, layers 103A-C may be combined: for example, layers 103B and 103C may be provided as a single membrane.

With respect to electromechanical layer 103A, key caps extend out of an upper surface of keyboard 103 to provide a user with selectable inputs based upon the characters associated with the keys, such as a QWERTY keyboard that provides ASCI binary code inputs to the keyboard controller. A membrane disposed beneath keys may detect key inputs and generate a signal unique to each key. The membrane may be, for example, a flexible printed circuit board with wirelines that feed to a cable so that key inputs may be uniquely identified. Lever structures may be disposed below the keycaps to bias the keys in an upwards direction. End users provide inputs by pressing on keys to overcome the bias of these lever structures, to thereby impact the membrane.

As a person of ordinary skill in the art will recognize, hovering keyboard 103 may have a variety suitable of structures for placement of keys as individual caps (or assembled as one part) and for biasing keys (such as springs, magnets, and/or other types of devices).

Electromechanical layer 103A provides a grid of circuits underneath the keys of keyboard 103 that forms an N×M matrix. These circuits are configured to generate signals in response to the user pressing the keys. For example, the circuits may be broken underneath the keys such that, when a user depresses a given key, the electric circuit underneath that key is completed. Keyboard controller 300 receives a signal output by that circuit and compares the location of the circuit to a character map stored in its memory to determine which key was physically pressed.

Backlight illumination layer 103B may include an Organic Light Emitting Diode (OLED) material, such as an OLED film that is selectively powered with an electrical current under the control of keyboard controller 300. The OLED film be disposed at various locations of keyboard's structure in order to obtain desired illumination at selected keys. For example, the OLED film may be deposited directly on electrical contacts of membrane 103B so that a controller may selectively illuminate OLED film under any keycap, by applying an electrical current to it. In some cases, backlight illumination layer 103B may further include a lightguide structure or the like, configured to route light from its LED source to a particular keycap through keyboard 103.

Proximity sensing layer 103C provides keyboard 103 with the ability to detect keypresses without the end user making physical contact with key caps. The proximity sensors of sensing layer 103C may comprise any of a number of different types of known sensors configured to measure a distance or proximity of an object, and to produce corresponding signals in response. In some implementations, proximity sensors may overlay or lie underneath the keys of hovering keyboard 103. In other implementations, sensors may be integrated within each respective key.

In the embodiment of FIG. 1, the proximity sensors may include a grid of sensors underneath the keys of keyboard 103 disposed on layer 103C. The proximity sensors may be capacitive sensors configured such that their electric fields (sensing fields) are directed through the key caps and upward from the top surface keyboard 103. The proximity sensors are configured to detect an object such as a user's fingers, and to produce signals representative of the proximity of the object. Keyboard controller 300 may process these signals to determine the position and/or movement of the detected object relative to the proximity sensors, and to capture inputs having certain characteristics as corresponding hovering keystrokes.

In some implementations, the detection of hovering keystrokes via proximity sensing layer 103C may take place in addition, or as an alternative to, the concurrent detection of physical keystrokes by electromechanical layer 103A.

Figures 2, 3:
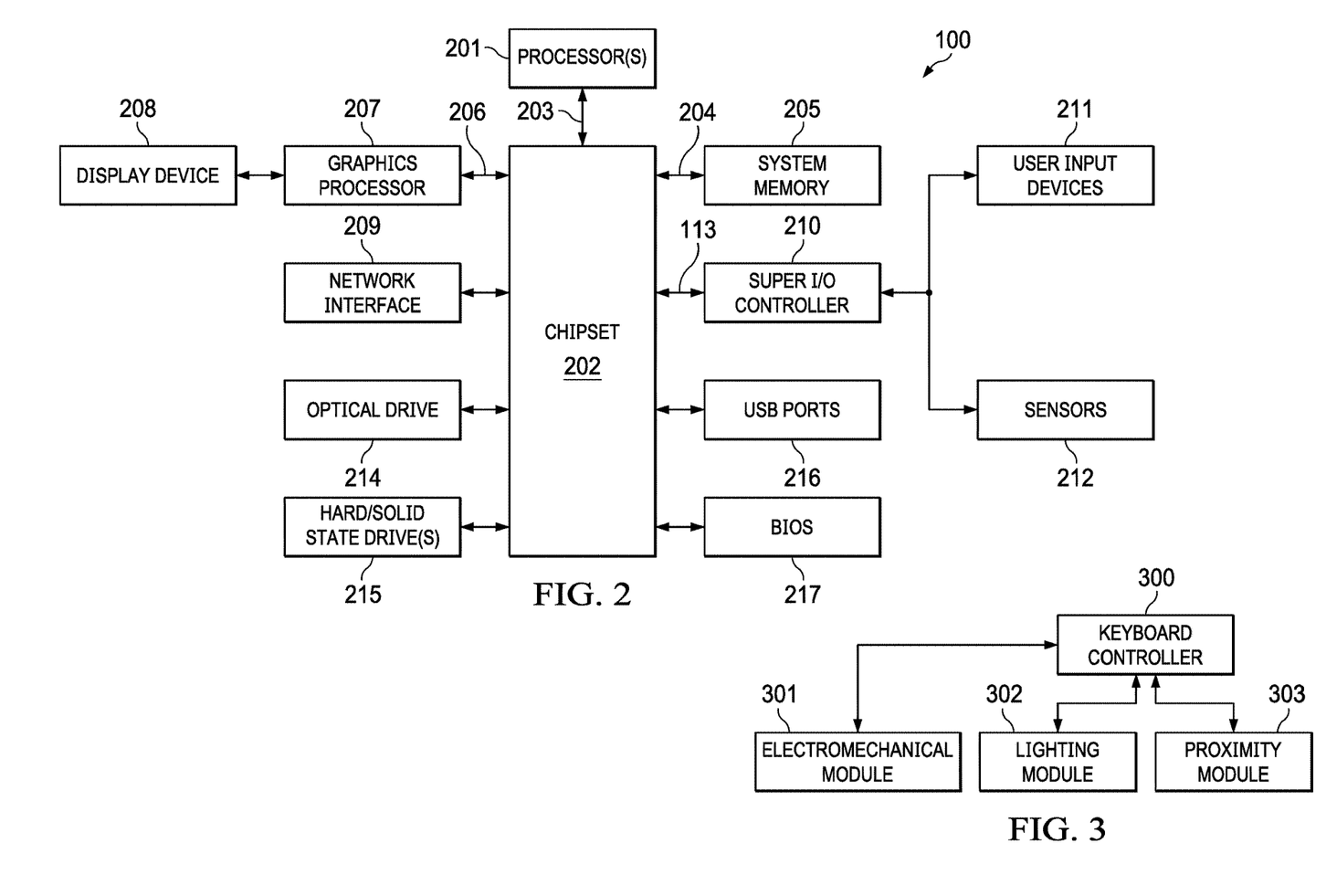
FIG. 2 is a block diagram of electronic components of an IHS, according to some embodiments.
FIG. 3 is a block diagram of electronic components of a hovering keyboard, according to some embodiments.

FIG. 2 is a block diagram of components of IHS 100. Particularly, IHS 100 may include one or more processors 201. In various embodiments, IHS 100 may be a single-processor system including one processor 201, or a multi-processor system including two or more processors 201. Processor(s) 201 may include any processor capable of executing program instructions, such as an INTEL PENTIUM series processor or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 202 that may have one or more integrated circuits coupled to processor(s) 201. In certain embodiments, the chipset 202 may utilize a DMI (Direct Media Interface) or QPI (QuickPath Interconnect) bus 203 for communicating with processor(s) 201.

Chipset 202 provides processor(s) 201 with access to a variety of resources. For instance, chipset 202 provides access to system memory 205 over memory bus 204. System memory 205 may be configured to store program instructions and/or data accessible by processors(s) 201. In various embodiments, system memory 205 may be implemented using any suitable memory technology, such as static RAM (SRAM), synchronous dynamic RAM (SDRAM), nonvolatile/Flash-type memory, or any other type of memory.

Chipset 202 may also provide access to graphics processor 207. In certain embodiments, graphics processor 207 may be part of one or more video or graphics cards that have been installed as components of IHS 100. Graphics processor 207 may be coupled to chipset 202 via graphics bus 206 such as provided by an Accelerated Graphics Port (AGP) bus, or a Peripheral Component Interconnect Express (PCIe) bus. In certain embodiments, graphics processor 207 generates display signals and provides them to display device 208. In certain embodiments, display device 208 may be a touch-sensitive display.

In some implementations, chipset 202 may also provide access to one or more user input devices 211. For instance, chipset 202 may be coupled to super I/O controller (SIO) 210 or an embedded controller (EC) via eSPI (Enhanced Serial Peripheral Interface) or Low-Pin Count (LPC) bus 213, and SIO 210 may provide interfaces for a variety of user input devices 211 (e.g., lower bandwidth and low data rate devices). Particularly, SIO 210 may provide access to keyboard 103 and a mouse, or other peripheral input devices such as keypads, biometric scanning devices, and voice or optical recognition devices.

SIO 210 may also provide an interface for communications with one or more sensor devices 212, which may include environment sensors, such as a temperature sensor or other cooling system sensors. These I/O devices, such as user input devices 211 and sensor devices 212, may interface with SIO 210 through wired or wireless connections.

Other resources may also be coupled to processor(s) 201 of IHS 100 through chipset 202. For example, chipset 202 may be coupled to network interface 209, such as a Network Interface Controller (NIC). In certain embodiments, network interface 209 may be coupled to chipset 202 via a PCIe bus. Network interface 209 may support communication via various wired and/or wireless networks.

Chipset 202 may also provide access to one or more hard disk and/or solid state drives 215. In certain embodiments, chipset 202 may also provide access to one or more optical drives 214 or other removable-media drives. Any or all of drive devices 214 and 215 may be integral to IHS 100, or they may be located remotely. Chipset 202 may also provide access to one or more Universal Serial Bus (USB) ports 216.

In certain implementations, chipset IHS 202 may support an $I^2C$ (Inter-Integrated Circuit) bus that may be used to communicate with various types of microcontrollers, microprocessor and integrated circuits that are typically integrated components of the motherboard of the IHS 100 and perform specialized operations. For example, such an $I^2C$ bus may be utilized to transmit and receive keystroke and hovering keystroke information from an attached keyboard device, and to provide that information to an operating system (OS) executed by IHS 100.

Another resource that may be accessed by processor(s) 201 via chipset 202 is Basic Input/Output System (BIOS) 217. Upon booting of IHS 100, processor(s) 201 may utilize BIOS 217 instructions to initialize and test hardware components coupled to IHS 100 and to load an OS for use by IHS 100. BIOS 217 provides an abstraction layer that allows the OS to interface with certain hardware components that are utilized by IHS 100. The Unified Extensible Firmware Interface (UEFI) was designed as a successor to BIOS; many modern IHSs utilize UEFI in addition to or instead of a BIOS. As used herein, BIOS is also intended to encompass UEFI.

Chipset 202 may also provide an interface for communications with one or more sensors 212. Sensors 212 may be disposed within display 101, chassis 102, keyboard 103, hinge 104, and/or trackpad 105, and may include, but are not limited to: electric, magnetic, radio, optical, infrared, thermal, force, pressure, acoustic, ultrasonic, proximity, position, deformation, bending, direction, movement, velocity, gyroscope, rotation, and/or acceleration sensor(s).

In various embodiments, keyboard controller 300 (shown in FIG. 3) may utilize different interfaces for communicating with the OS of IHS 100. For instance, keyboard controller 300 may interface with the chipset 202 via super I/O controller 210.

FIG. 3 is a block diagram of electronic components of hovering keyboard 103. As depicted, components of keyboard 103 include keyboard controller or processor 300 coupled to electromechanical module 301, lighting module 302, and proximity module 303. Each of modules 301-303 may include electronic circuits and/or program instructions that enable that module to communicate with keyboard controller 300.

Electromechanical module 301 may be used to control the operation of and/or to detect events originated by electromechanical layer 103A, lighting module 302 may be used to control the operation of backlight illumination layer 103B, and proximity module 303 may be used to control the operation of and/or to detect events originated by proximity sensing layer 103C. In other implementations, an additional wireless communication module (not shown) may be coupled to keyboard controller 300 to enable communications between keyboard 103 and IHS 100 using a suitable wireless protocol.

Keyboard controller 300 may be configured to detect and identify individual physical keypresses or keystrokes made by the end user via electromechanical layer 103A. Keyboard controller or processor 300 may also be configured to control the operation of each individual LED of backlight illumination layer 103B using parameters such as, for example, a selected location (e.g., in an N×M matrix, as an identified key or set of keys, etc.), a selected color (e.g., when the backlight includes RGB LEDs), and a selected intensity (e.g., brighter or dimmer). In addition, keyboard controller 300 may be configured to detect and identify individual hovering keypresses made by the end user via proximity sensing layer 103C.

In various embodiments, IHS 100 and/or hovering keyboard 103 may not include all of components shown in FIGS. 2 and 3, respectively. Additionally, or alternatively, IHS 100 and/or hovering keyboard 103 may include components in addition to those shown in FIGS. 2 and 3, respectively. Additionally, or alternatively, components represented as discrete in FIGS. 2 and 3 may instead be integrated with other components. For example, all or a portion of the functionality provided by these various components may be provided as a System-On-Chip (SOC), or the like.

Figure 4:
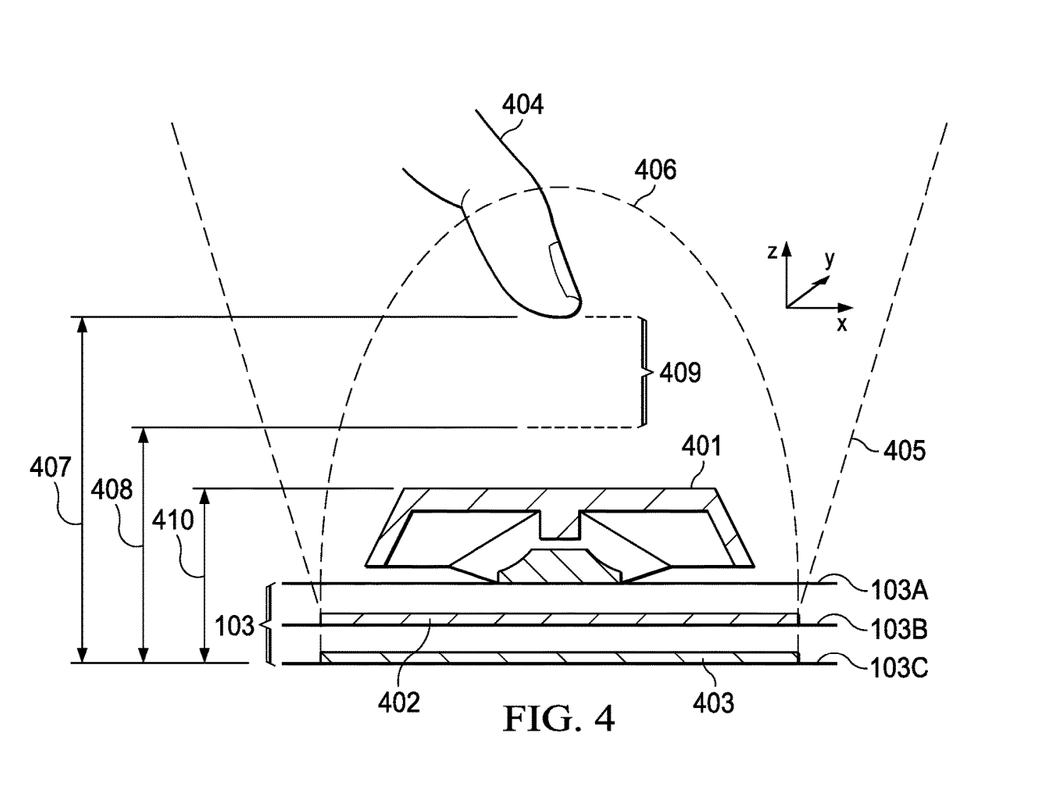
FIG. 4 is sectional view of a hovering keyboard in operation, according to some embodiments.

FIG. 4 is sectional view of hovering keyboard 103 in operation, according to some embodiments. As depicted, hovering keyboard 103 includes electromechanical layer 103A, backlight illumination layer 103B, and proximity sensing layer 103C. Electromechanical layer 103A hosts a key assembly, which includes keycap 401 as well as a dome, switches, and/or levers configured to receive and capture physical keystrokes.

Backlight illumination layer 103B includes lighting element 402 under key assembly 401. Illumination element 402 may include one or more LEDs (or one or more transparent areas from where light can exist a light guide, for example) that are configured to shine light 405, using one or more selected parameters (e.g., color, intensity, etc.), under keycap 401. In some cases, element 402 may be disposed in a matrix of like elements as part of backlight illumination layer 103B, each element located under a corresponding key of electromechanical layer 103A.

Proximity sensing layer 103C includes proximity sensor 403 under key assembly 401, such as a capacitive sensor, an infrared sensor, or an ultrasonic sensor that is configured to provide sensing field 406. Examples of suitable proximity sensors include GESTIC sensors from Microchip Technology Inc. In some cases, proximity sensor 403 may be disposed in a matrix of similar elements on proximity sensing layer 103C, and each proximity sensor may be located under a respective key of electromechanical layer 103A.

In this example, assume that the user's finger or fingertip 404 is resting at position 407 relative to proximity sensing layer 103C. When finger 404 travels by a selected or configurable distance 409 (in the vertical axis "z") to position 408 from proximity sensing layer 103C, the disturbance caused by the user's finger 404 upon sense field 406 triggers detection of a hovering keypress corresponding to keycap 401—without finger 404 having to touch keycap 401.

In some cases, height 407 may be configured to become aligned with the height of keycap 401, shown here as height 410. In that case, a hovering keypress can be detected when key cap 401 travels by distance 409 (e.g., 1 mm or 2 mm) from its initial position—a shorter travel distance (and less force) than a physical keypress would require.

Figure 5:
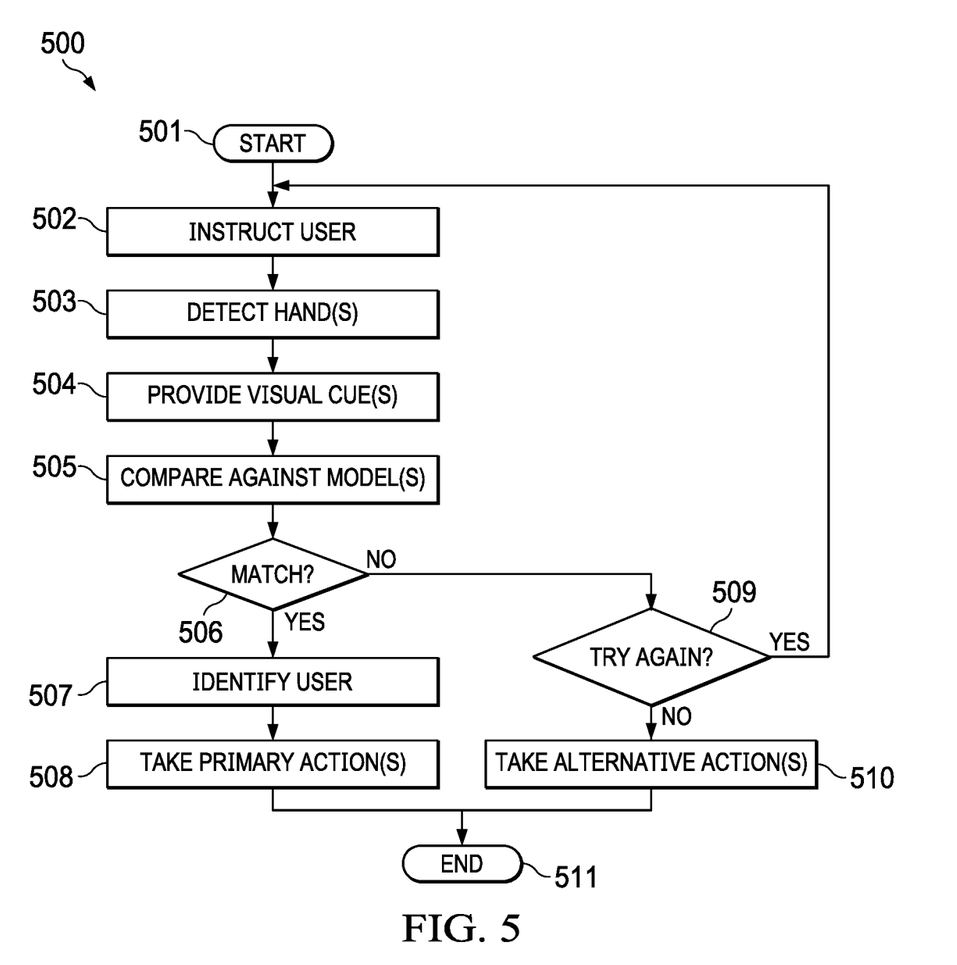
FIG. 5 is a flowchart of a method for identifying users via hand detection using a hovering keyboard, according to some embodiments.

FIG. 5 is a flowchart of method 500 for identifying users via hand detection using a hovering keyboard. In various implementations, program instructions for executing method 500 may be stored in memory 205 and executable by processor(s) 201. In some cases, method 500 may be performed by one or more standalone software applications, drivers, libraries, or toolkits, accessible via an Application Programming Interface (API) or the like. Additionally, or alternatively, method 500 may be performed by the IHS's OS.

Method 500 begins at block 501. At block 502, method 500 may provide a user with instructions for initiating a hand identification operation. Examples of instructions include, but are not limited to, textual or graphical instructions provided via display 101, audio instructions played through a loudspeaker, other visual instructions that use the keyboard's backlight illumination layer 103B, or any combination thereof. For example, such instructions may request that the user place their left or right hands (or both hands) over hovering keyboard 103 as part of: an authentication operation (e.g., multi-factor authentication), a keyboard layout re-configuration operation, or to enforce other preferences associated with the user.

In some cases, the instructions may ask the user to make one or more selected physical keystrokes (e.g., "press the 'Enter' key"), as part of the detection process. In other cases, the instructions may tell the user to make one or more selected hovering keystrokes (e.g., "move finger down and up as if pressing the 'Enter' key, but without touching the key"), also as part of the detection process.

At block 503, after giving the instructions, method 500 may begin detecting the user's hand using proximity sensors 403, for example, while the user positions their hand(s) as instructed or performs physical or hovering keystrokes. Generally, detection begins when proximity sensor data is received at IHS 100 from proximity sensing layer 103C within hovering keyboard 103. In some implementations, proximity sensor data may be processed, to some degree, by keyboard controller 300. Then, the proximity sensor data is further processed by processor(s) 201.

For example, proximity signals that exhibit above-threshold distances and/or motion over a suitable time interval are collected, and then processor(s) 201 attempts to match the captured proximity sensor data to a geometric model of a user's hand. If a suitable match is found, then the hand may be recognized as that of the corresponding user.

In some embodiments, processor(s) 201 be configured to analyze proximity signals from each distinct sensor in order to determine what part of the user's hand each signal represents. A number of different hand-part assignment techniques may be used. For instance, each signal may be assigned a hand-part index. The hand-part index may include a discrete identifier, confidence value, and/or hand-part probability distribution indicating the hand part or parts to which that signal is likely to correspond.

Machine learning may be used to assign each signal a hand-part index and/or hand-part probability distribution. A machine-learning module may analyze a user's hand with reference to information learned from a previously trained collection of known hands and/or hand features. During a training phase, a variety of hand positions or gestures may be observed, and trainers may label various classifiers in the observed data. The observed data and annotations may then be used to generate one or more machine-learned algorithms that map inputs (e.g., observation data from proximity sensors) to desired outputs (e.g., hand-part indices for relevant signals).

Thereafter, a partial virtual skeleton may be fit to at least one hand part identified. In some embodiments, a hand-part designation may be assigned to each skeletal segment and/or each joint. Such virtual skeleton may include any type and number of skeletal segments and joints, including each individual finger.

In some embodiments, each joint may be assigned a number of parameters, such as, for example, Cartesian coordinates specifying its position, angles specifying its rotation, and other parameters (e.g., open hand, closed hand, length, width, joint position, angle of joint rotation, and a description of any finger segment). Then, a virtual skeleton may be fit to each of a sequence of hand parts identified from the proximity sensor data. By analyzing and comparing the various skeletal joints and/or segments, in response to finding a match against trained data, the hand of a particular user may be identified.

In some cases, block 503 may be used to identify the individual user, for example, by retrieving a username, password, or the like. In other cases, block 503 may be used to make a distinction between children and adults, for example, based on detected hand size.

Still during the detection process, block 504 may provide one or more visual cues to the user using backlight illumination layer 103B. In configuration 600A of FIG. 6A, a user's hand 600 hovers over keyboard 103 in the position indicated by light pattern 601. Different colors and/or brightness may be applied under different keycaps to guide the user to a proper hand position over the keyboard.

Figure 6A:
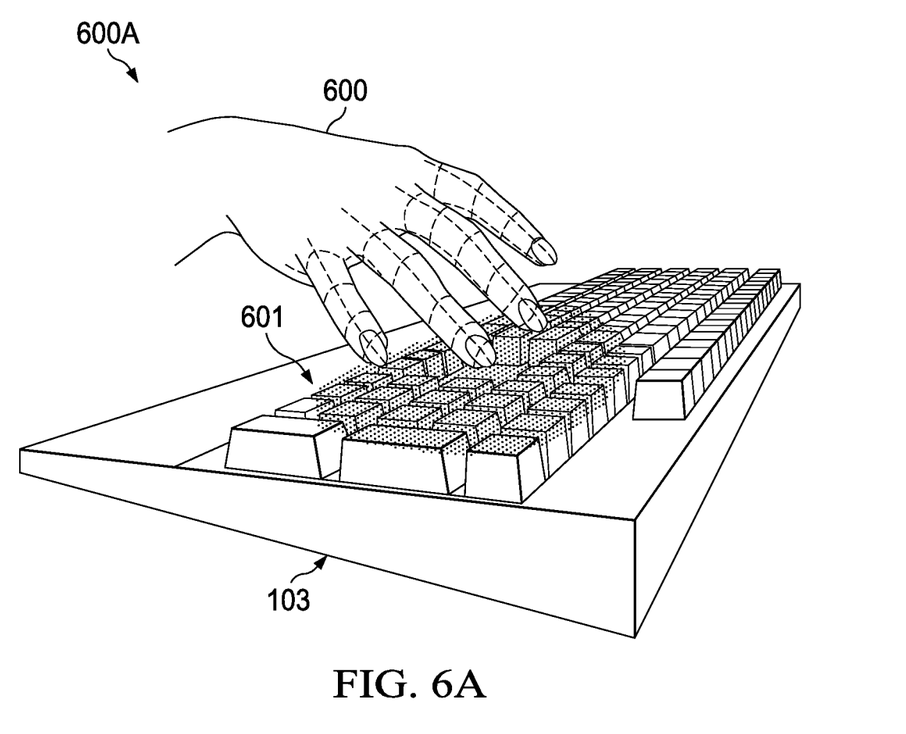
FIGS. 6A and 6B are diagrams illustrating different application examples, according to some embodiments.

For example, selected key caps may light up with an intensity proportional to the distance between the hand and those keys, such that the amount of light increases (or the color changes) as the user moves hand 600 toward those keys. Then, the same lights (or all lights) may blink a number of times when the user reaches the proper position for detection. As a person of ordinary skill in the art will recognize, however, other suitable lighting patterns or instructions may be used.

Figure 6B:
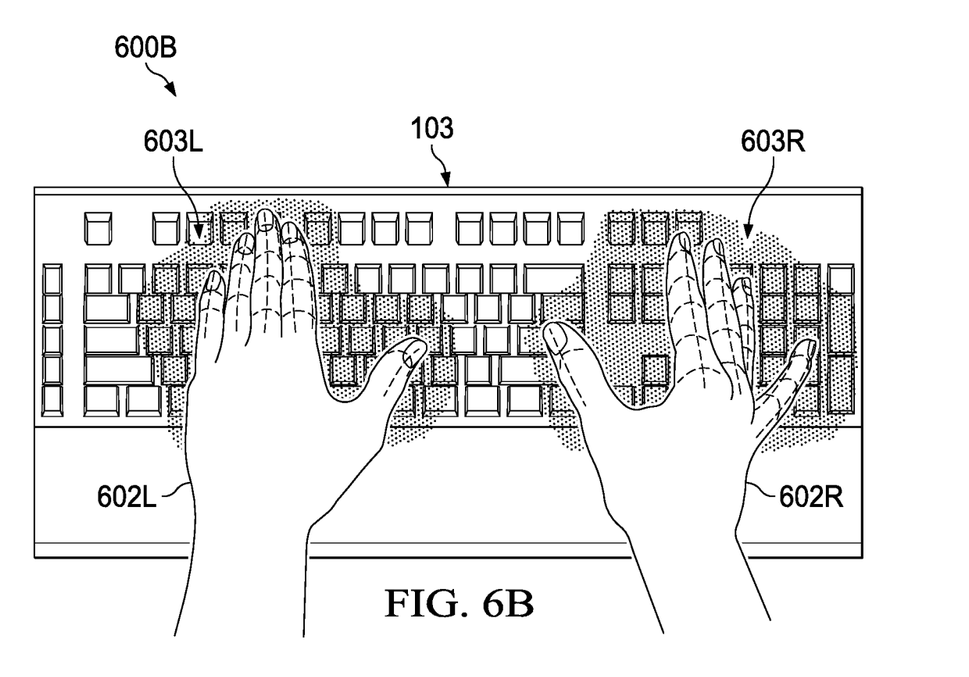

Still referring to the visual cues provided by block 504, configuration 600B of FIG. 6B shows left hand 601L and right hand 601R resting over hovering keyboard 103 above light patterns 603L and 603R, respectively. In this case, areas 603L and 603R may indicate expected physical or hovering keypresses. In some cases, the IHS may light selected keys 603L and 603R corresponding to a position of hands 601L and 601R over hovering keyboard 103, such that each of the selected keys is lit with a color or a brightness corresponding to a current distance between a portion of the hand above the selected keys and the hovering keyboard 103.

At block 505, method 500 compares the proximity sensor data detected in block 503 against one or more models of human hands, for the same or different users. Then, block 506 determines whether the proximity sensor data has a match. If so, block 507 identifies the user (e.g., child/adult or username/password). At block 508, method 500 takes one or more primary responsive actions. Examples of such actions include, but are not limited to: logging into IHS 100, opening a selected application, gaining access to a memory, using a protected password, performing a two-part authentication operation, configuring or re-mapping functional keys ("F-keys"), applying a selected layout to hovering keyboard 103, or enabling/disabling one or more keys of hovering keyboard 103 (e.g., during execution of a gaming application).

Conversely, if block 506 does not find a match, block 509 determines whether to try again, for example, after prompting the user. If so, control returns to block 502. Otherwise, at block 510, method 500 takes one or more alternative actions. Examples of alternative actions include, but are not limited to: locking or restricting access to IHS 100 as a security measure, alerting an IHS administrator, recording video captured with a camera or audio captured with a microphone, turning on/off hovering keystroke detection, turning on/off physical keystroke detection, disabling or enabling trackpad 105, enforcing parental controls, closing an application or file, restricting access to a memory, etc. Then, method 500 ends at block 511.

In alternative implementations, method 500 may be performed without instructing the user. In yet other implementations, method 500 may be performed entirely without the user's awareness, as the user naturally operates hovering keyboard 103 to interact with IHS 100. Moreover, the aforementioned machine-learning algorithm may adjust the stored hand-part models for each user over time, as the user's measurements change within acceptable thresholds after a selected time interval (e.g., as a child grows).

It should be understood that various operation described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution by the processor, cause the IHS to:
   detect a hand using proximity sensors disposed on a hovering keyboard coupled to the IHS;
   fit proximity data obtained by the proximity sensors to a virtual skeleton of the hand, wherein the virtual skeleton comprises one or more parameters selected from the group consisting of: a length, a width, a joint position, an angle of joint rotation, and a finger segment; and
   identify a user based on the fitting.

2. The IHS of claim 1, wherein identifying the user comprises distinguishing whether the user is a child or an adult.

3. The IHS of claim 1, wherein identifying the user comprises identifying a username.

4. The IHS of claim 1, wherein to identify the user, the program instructions, upon execution, cause the IHS to instruct the user to place the hand over the hovering keyboard.

5. The IHS of claim 1, wherein to identify the user, the program instructions, upon execution, cause the IHS to instruct the user to make one or more selected physical keystrokes.

6. The IHS of claim 1, wherein to identify the user, the program instructions, upon execution, cause the IHS to instruct the user to make one or more selected hovering keystrokes.

7. The IHS of claim 1, wherein the program instructions, upon execution, cause the IHS to light selected keys corresponding to a position of the hand over the hovering keyboard.

8. The IHS of claim 1, wherein each of the selected keys is lit with a color or a brightness corresponding to a distance between a portion of the hand above the selected key and the hovering keyboard.

9. The IHS of claim 8, wherein at least one of the selected keys is lit with a first color or brightness during the detection, and with a second color or brightness in response to the identification.

10. The IHS of claim 1, wherein the program instructions, upon execution, cause the IHS to apply a selected one of a plurality of different layouts to the hovering keyboard based upon the identification of the user.

11. The IHS of claim 10, wherein the selected layout assigns a function key of the hovering keyboard to a user preference.

12. The IHS of claim 10, wherein the selected layout disables one or more keys of the hovering keyboard.

13. A method, comprising:
    detecting a hand, by an Information Handling System (IHS), using proximity sensors disposed on a hovering keyboard coupled to the IHS;
    lighting selected keys of the hovering keyboard corresponding to a position of the hand, wherein each of the selected keys is lit with a color or a brightness corresponding to a distance between a portion of the hand above the selected key and the hovering keyboard; and
    identifying a user, by the IHS, based on the detection.

14. The method of claim 13, further comprising fitting proximity data obtained by the proximity sensors to a partial virtual skeleton of the hand having one or more parameters selected from the group consisting of: a length, a width, a joint position, an angle of joint rotation, and a finger segment.

15. The method of claim 13, further comprising, in response to: (i) the user being identified as a child, or (ii) the identification of the user not matching a user logged into the IHS, performing at least one of: alerting an administrator, turning physical keystroke detection on or off, enforcing parental controls, or closing an application or file.

16. A hardware memory device having program instructions stored thereon that, upon execution by a processor of an Information Handling System (IHS), cause the IHS to:
    detect a hand using proximity sensors disposed on a hovering keyboard coupled to the IHS;
    fit proximity data obtained by the proximity sensors to a virtual skeleton of the hand, wherein the virtual skeleton comprises one or more parameters selected from the group consisting of: a length, a width, a joint position, an angle of joint rotation, and a finger segment; and
    identify a user based on the fitting.

17. The hardware memory device of claim 16, wherein the program instructions, upon execution, further cause the IHS to apply a selected one of a plurality of different layouts to the hovering keyboard based upon the identification of the user.

* * * * *